United States Patent
Tanno et al.

(10) Patent No.: US 7,437,156 B2
(45) Date of Patent: Oct. 14, 2008

(54) MOBILE COMMUNICATION SYSTEM AND BASE STATION IN THE MOBILE COMMUNICATION SYSTEM FOR SAVING POWER CONSUMPTION OF MOBILE STATION

(75) Inventors: Motohiro Tanno, Yokosuka (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 567 days.

(21) Appl. No.: 10/227,818

(22) Filed: Aug. 27, 2002

(65) Prior Publication Data
US 2003/0045320 A1 Mar. 6, 2003

(30) Foreign Application Priority Data
Aug. 28, 2001 (JP) ............................. 2001-258558

(51) Int. Cl.
*H04Q 7/20* (2006.01)
(52) U.S. Cl. .................. 455/434; 455/436; 455/574; 370/331
(58) Field of Classification Search .............. 455/67.11, 455/69, 522, 574, 434, 515, 436–444; 370/331–333
See application file for complete search history.

(56) References Cited

U.S. PATENT DOCUMENTS

| 5,245,629 | A | * | 9/1993 | Hall ............................ 455/522 |
| 5,566,366 | A | | 10/1996 | Russo et al. |
| 6,385,460 | B1 | * | 5/2002 | Wan ............................ 455/515 |
| 6,385,462 | B1 | * | 5/2002 | Baum et al. .................. 455/522 |
| 6,393,276 | B1 | * | 5/2002 | Vanghi ..................... 455/422.1 |
| 6,453,166 | B1 | | 9/2002 | Ishikawa et al. |
| 6,633,554 | B1 | * | 10/2003 | Dalal ......................... 370/331 |
| 2002/0019245 | A1 | * | 2/2002 | Longoni et al. ............. 455/522 |
| 2002/0027890 | A1 | * | 3/2002 | Bernstein et al. ............ 370/331 |

FOREIGN PATENT DOCUMENTS

| CN | 1256058 | 6/2000 |
| EP | 0 812 119 | 12/1997 |
| EP | 1 037 477 | 9/2000 |
| EP | 1037477 A1 * | 9/2000 |
| EP | 1 143 757 | 10/2001 |
| JP | 6-105363 | 4/1994 |
| JP | 2001-128204 | 5/2001 |
| WO | WO 01/31962 | 5/2001 |

* cited by examiner

*Primary Examiner*—Edward Urban
*Assistant Examiner*—Raymond S Dean
(74) *Attorney, Agent, or Firm*—Oblon, Spivak, McClelland, Maier & Neustadt, P.C.

(57) ABSTRACT

A mobile communication system is provided for decreasing power consumption in a mobile station. In the mobile communication system, a base station or a radio network control apparatus sets a threshold of signal energy to noise power density ratio of a common pilot signal according to downlink total sending power, which may change every moment, and sends the threshold to the mobile station 110. The mobile station 110 measures the ratio, and omits surrounding cell measurement when the measured ratio exceeds the threshold.

22 Claims, 5 Drawing Sheets

MOBILE COMMUNICATION SYSTEM AND BASE STATION IN THE MOBILE COMMUNICATION SYSTEM FOR SAVING POWER CONSUMPTION OF MOBILE STATION

BACKGROUND OF THE INVENTION

1. Field of the Invention

The present invention relates to a mobile communication system, a base station in a mobile communication system, a radio network control apparatus, a mobile station and a power consumption decreasing method, in which, the mobile station omits receiving level measurement for a signal from base stations when a signal energy to noise power density ratio of a common pilot signal (to be referred to as Ec/No hereinafter) exceeds a predetermined threshold, wherein the common pilot signal is sent to the mobile station from a base station that forms a cell where the mobile station resides.

2. Description of the Related Art

In W-CDMA (Wide-band Code Division Multiple Access), which is a radio access method in the third generation mobile communication system, when a mobile station does not reside in an optimal cell among cells formed by base stations while the mobile station is in a standby status, a control signal of upward direction (called an uplink control signal hereinafter) sent from the mobile station may not reach the base station, or even when the signal reaches the base station, the uplink control signal may cause excessive interference for cells formed by other base stations, so that system capacity may be degraded. In addition, it becomes hard for the mobile station to receive a control signal of downward direction (called a downlink control signal hereinafter) sent from the base station, so that the base station needs to send the downlink control signal by using a large sending power. The system capacity is degraded also for this reason. Therefore, in W-CDMA, it is necessary for the mobile station to reside in an optimal cell while the mobile station is in a standby status.

In order for the mobile station to reside in an optimal cell, the mobile station needs to search signals sent from surrounding base stations and to measure receiving levels of the signals (this measurement is called "surrounding cell measurement" hereinafter). However, since the surrounding cell measurement consumes much power, if the mobile station performs the surrounding cell measurement simply periodically without any remedy, battery life of the mobile station becomes short. Thus, in the W-CDMA, a method for performing surrounding cell measurement only when necessary is adopted. In the method, the mobile station measures Ec/No per one chip of the common pilot signal sent from a base station forming a cell where the mobile station resides (to be referred to as a residing cell hereinafter), and if the measured value exceeds a predetermined threshold (which is unchangeable), it is determined that the residing cell is optimal, so that surrounding cell measurement is omitted.

However, if the threshold is a fixed value, a following problem described with reference to FIG. 1 arises.

A case is considered in which a small constant value is set as the threshold of Ec/No assuming that total sending power of signals sent from base stations (to be referred to as downlink total sending power hereinafter) is large. The reason for setting a small constant value as the threshold of Ec/No is that, if the downlink total sending power is large, interference power of downward direction (called downlink interference power) becomes large, so that Ec/No becomes small.

In FIG. 1, region 1 is a region of a cell formed by a base station, and region 2 indicates a region where the surrounding cell measurement is unnecessary, and threshold A indicates a fixed threshold of Ec/No established considering a case when the downlink total sending power is large.

As shown in FIG. 1, when the downlink total sending power is actually large, Ec/No in the mobile station becomes less than the threshold A in a position where the mobile station is out of the region 2. Therefore, the surrounding cell measurement can be performed only when necessary if the surrounding cell measurement is performed only when Ec/No becomes smaller than the threshold A.

However, when the total sending power is actually small, Ec/No in the mobile station does not become less than the threshold A until the mobile station goes out of the region 3 which is larger than the region 2. Therefore, if the surrounding cell measurement is performed only when Ec/No becomes less than the threshold A, there occurs a problem in that the surrounding cell measurement is not performed even when the mobile station resides in a region (between the region 2 and the region 3) where the surrounding cell measurement is necessary.

Next, with reference to FIG. 2, a case is considered in which a large constant value is set as the threshold of Ec/No assuming that downlink total sending power is small, for realizing the method in which surrounding cell measurement is performed only when necessary. The reason for setting a large constant value as the threshold of Ec/No is that, if the downlink total sending power is small, downlink interference power becomes small, so that Ec/Nc becomes large.

In FIG. 2, region 1 is a region of a cell formed by a base station, and region 2 indicates a region where the surrounding cell measurement is unnecessary, and threshold B indicates the threshold of Ec/No established assuming that the downlink total sending power is small.

As shown in FIG. 2, when the total sending power is actually small, Ec/No in the mobile station becomes less than the threshold value B in a position where the mobile station is out of the region 2. Therefore, the surrounding cell measurement is to be performed as necessary if the surrounding cell measurement is performed only when Ec/No becomes smaller than the threshold B.

However, if the total sending power is actually large in this case, the Ec/No in the mobile station becomes less than the threshold B if the mobile station goes out of the region 3, which is smaller than the region 2. Therefore, when the surrounding cell measurement is to be performed only when Ec/No becomes less than the threshold B, there occurs a problem in that the measurement is performed even when the mobile station resides in a region (between the region 2 and the region 3) where the surrounding cell measurement is unnecessary.

In addition, even when downlink total sending power is constant, Ec/No differs according to the size of the cell and to a condition for which the base station is placed such as in an urban area or in a suburban area. Therefore, when the threshold is set suitable for the urban area for surrounding cell measurement to be performed as necessary, there is a problem in that the measurement is not performed even when a mobile station resides in a region where the measurement is necessary in a suburban area, or, on the other hand, measurement is performed even when the mobile station is not in a region where the measurement is necessary.

Thus, a method is required for decreasing power consumption of a mobile station by performing surrounding cell measurement only when necessary, in other words, a method of improving battery life is required.

SUMMARY OF THE INVENTION

An object of the present invention is to provide a mobile communication system, a base station, a radio network control apparatus, a mobile station and a power consumption decreasing method for decreasing power consumption of the mobile station.

The object of the present invention can be achieved by a mobile communication system comprising a mobile station and a plurality of base stations, wherein, when a signal energy to noise power density ratio of a common pilot signal exceeds a threshold, the mobile station does not perform receiving level measurement for signals sent from the base stations, the common pilot signal being sent to the mobile station from a base station that forms a cell where the mobile station resides,
  the base station comprising:
    a part for setting the threshold according to a value, based on a predetermined criterion, which may change according to time;
    a part for sending the threshold to the mobile station;
  the mobile station comprising:
    a part for measuring the signal energy to noise power density ratio;
    a part for receiving the threshold sent from the base station.

According to this object, since the signal energy to noise power density ratio can be changed according to a value based on criteria, the mobile station can perform surrounding cell measurement only when necessary. Therefore, power consumption can be saved and battery life can be improved.

In the mobile communication system, the part for setting may set the threshold according to total power of signals sent by the base stations.

The total power is proportional to the signal energy to noise power density ratio. Therefore, by setting the threshold to be small when the total power is large, or by setting the threshold to be large when the total power is small, surrounding cell measurement in the mobile station can be performed only when necessary. Thus, according to present invention, power consumption of the mobile station can be decreased and battery life can be improved.

In the mobile communication system, the part for setting may set the threshold according to a total amount of downlink traffic from the base stations.

The total amount of traffic is in proportion to the total power. That is, the amount of traffic is inversely proportional to the signal energy to noise power density ratio. Therefore, by setting the threshold to be small when the amount of traffic is large, or by setting the threshold to be large when the amount of traffic is small, surrounding cell measurement in the mobile station can be performed only when necessary. Thus, according to the present invention, power consumption of the mobile station can be decreased and battery life can be improved.

In addition, in the mobile communication system, the part for setting may set the threshold according to time.

The amount of traffic changes according to time. For example, the amount of traffic is large in the daytime, and it is small in the nighttime. In addition, the amount of traffic is inversely proportional to the signal energy to noise power density ratio. Therefore, by setting the threshold to be small in the daytime when the amount of traffic is large, or by setting the threshold to be large in the nighttime when the amount of traffic is small, surrounding cell measurement in the mobile station can be performed only when necessary. Thus, according to present invention, power consumption of the mobile station can be decreased and battery life can be improved.

In addition, in the mobile communication system, the part for setting may set the threshold according to a condition for installing the base station.

The signal energy to noise power density ratio may vary according to a condition for installing the base station, such as the size of the cell formed by the base station, the place (urban area, suburban area) and the like where the base station is installed. Therefore, also by setting the threshold according to the condition for which the base station is installed, surrounding cell measurement in the mobile station can be performed only when necessary. Thus, according to the present invention, power consumption of the mobile station can be decreased and battery life can be improved.

Further, in the mobile communication system, the mobile station may further include a part for sending the signal energy to noise power density ratio to the base station, and a part for setting that sets the threshold according to the signal energy to noise power density ratio sent from the mobile station.

According to this object, by setting the threshold to be large when the actually measured signal energy to noise power density ratio is large, or by setting the threshold to be small when the actually measured signal energy to noise power density ratio is small, surrounding cell measurement in the mobile station can be performed only when necessary. Thus, according to the present invention, power consumption of the mobile station can be decreased and battery life can be improved.

The object of the present invention can be also achieved by a mobile communication system comprising a mobile station, a plurality of base stations and a radio network control apparatus, wherein, when a signal energy to noise power density ratio of a common pilot signal exceeds a threshold, the mobile station does not perform receiving level measurement for signals sent from the base stations, the common pilot signal being sent to the mobile station from a base station that forms a cell where the mobile station resides,
  the radio network control apparatus comprising:
    a part for setting the threshold according to a value, based on predetermined criteria, that may change every moment;
    a part for sending the threshold to the mobile station;
  the mobile station comprising:
    a part for measuring the signal energy to noise power density ratio;
    a part for receiving the threshold sent from the base station.

According to this object, since the signal energy to noise power density ratio can be changed according to a value based on criteria, the mobile station can perform surrounding cell measurement only when necessary. Therefore, power consumption can be saved and battery life can be improved.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
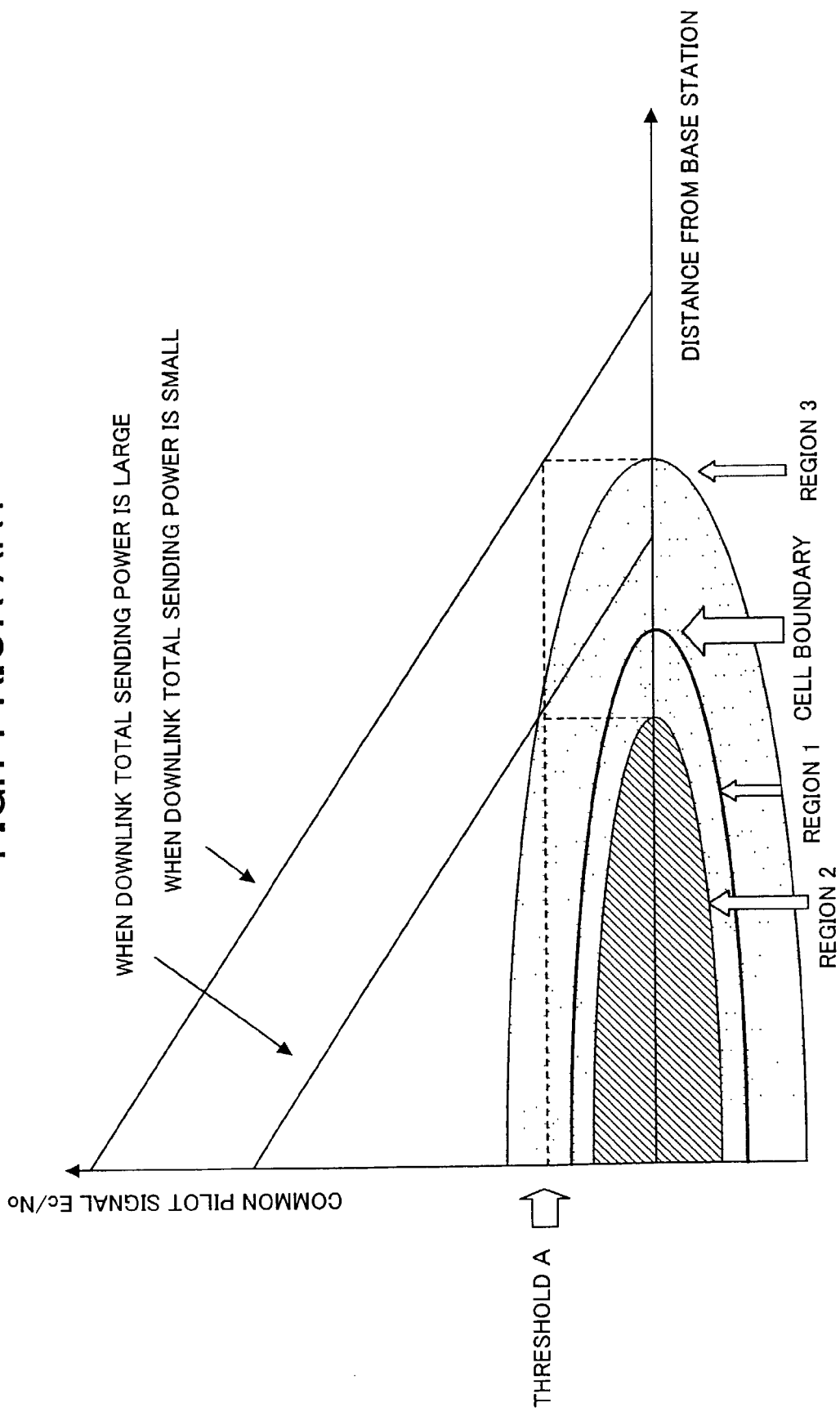
FIG. 1 is a figure for explaining the relationship between downlink total sending power and a threshold of Ec/No that is set unchangeably.
Figure 2:
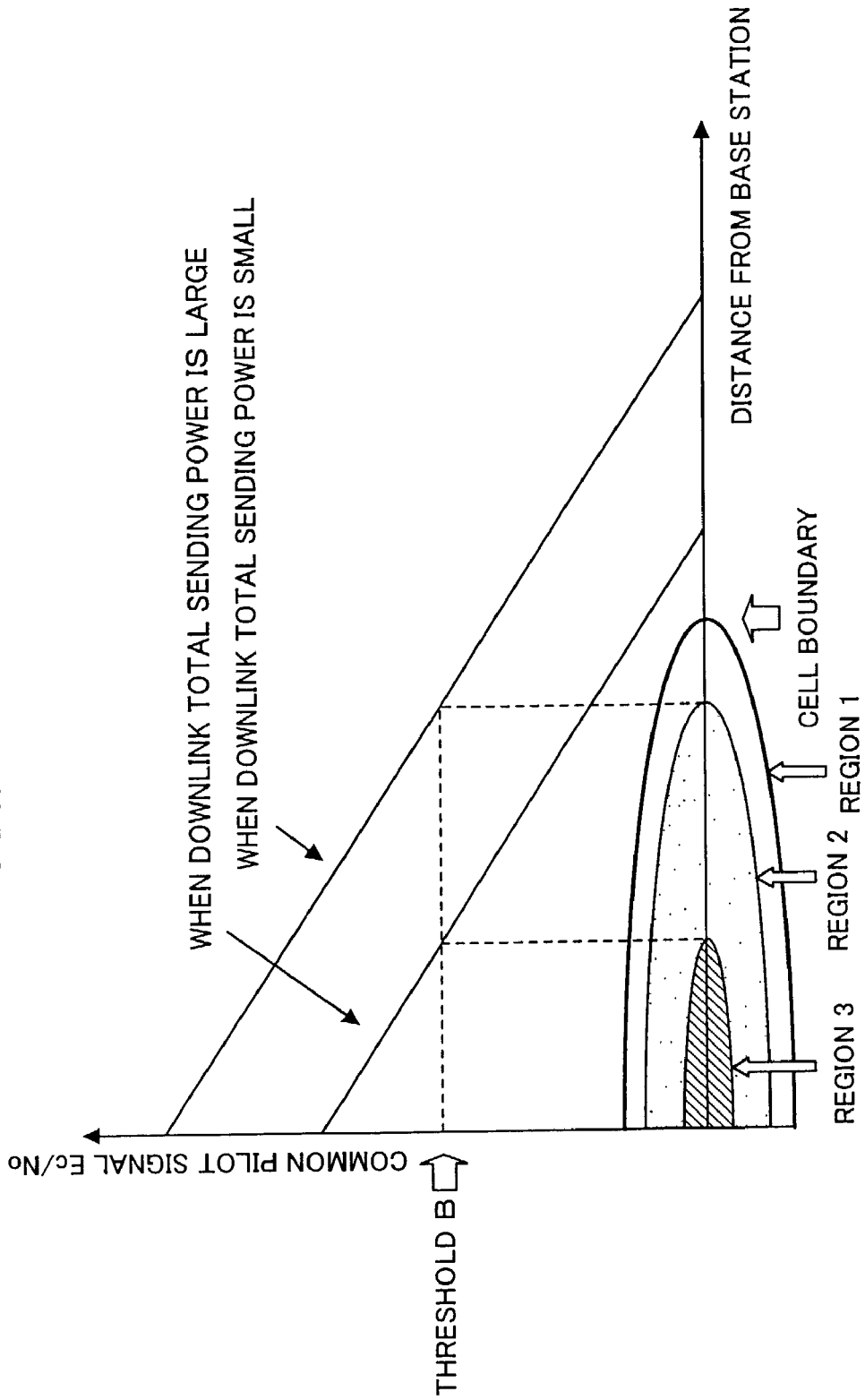
FIG. 2 is another figure for explaining the relationship between downlink total sending power and a threshold of Ec/No that is set unchangeably.
Figure 3:
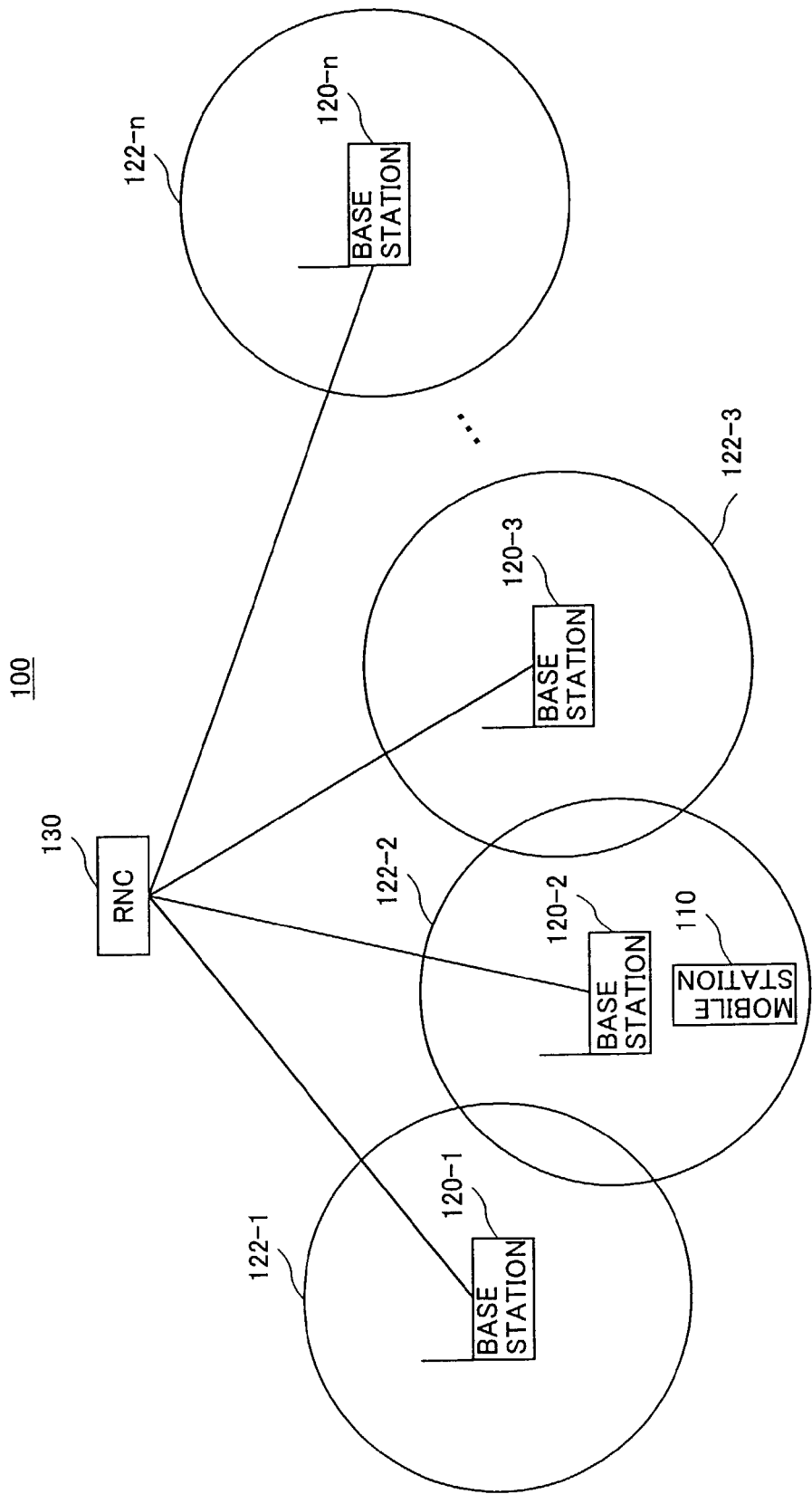
FIG. 3 shows a block diagram of an example of a mobile communication system 100 according to the present invention.

In the following, embodiments of the present invention will be described with reference to figures. FIG. 3 shows a block diagram of an example of a mobile communication system 100 according to an embodiment of the present invention. The mobile communication system 100 shown in the figure includes a mobile station 110 such as a cellular phone, a plurality of base stations 120-1-120-$n$ (which may be referred to as base stations 120 hereinafter), and a radio network control apparatus (RNC) 130 for controlling the mobile communication system 100.

In the mobile communication system 100, the mobile station 110 measures Ec/No per a chip of a common pilot signal sent from the base station 120 that forms a cell where the mobile station 110 resides. When the measurement value of Ec/No does not exceed a threshold set on the basis of criteria in the base station 120 or in the RNC 130, the mobile station 110 determines that the cell where the mobile station 110 itself resides is not optimal, so that the mobile station 110 searches signals sent from surrounding base stations, and measures the receiving level of each signal. Since the threshold is set according to a value that may change every moment, the threshold may change from moment to moment in this embodiment. When the measurement value of Ec/No exceeds the threshold determined on the basis of criteria in the base station 120 or the RNC 130, the mobile station 110 regards that the cell is optimal, so that the mobile station 110 does not perform the surrounding cell measurement.

Base stations 120-1-120-$n$ form cells 122-1-122-$n$ respectively. Each of the base stations sends a common pilot signal in the cell corresponding to the base station. The mobile station 110 resides in a cell 122-2 formed by a base station 120-2. Therefore, the mobile station 110 receives a common pilot signal sent from the base station 120-2.

The base station 120 or the RNC 130 sets a threshold of Ec/No per a chip of the common pilot signal that is a reference value used for determining whether the surrounding cell measurement is performed in the mobile station 110.

Figure 4:
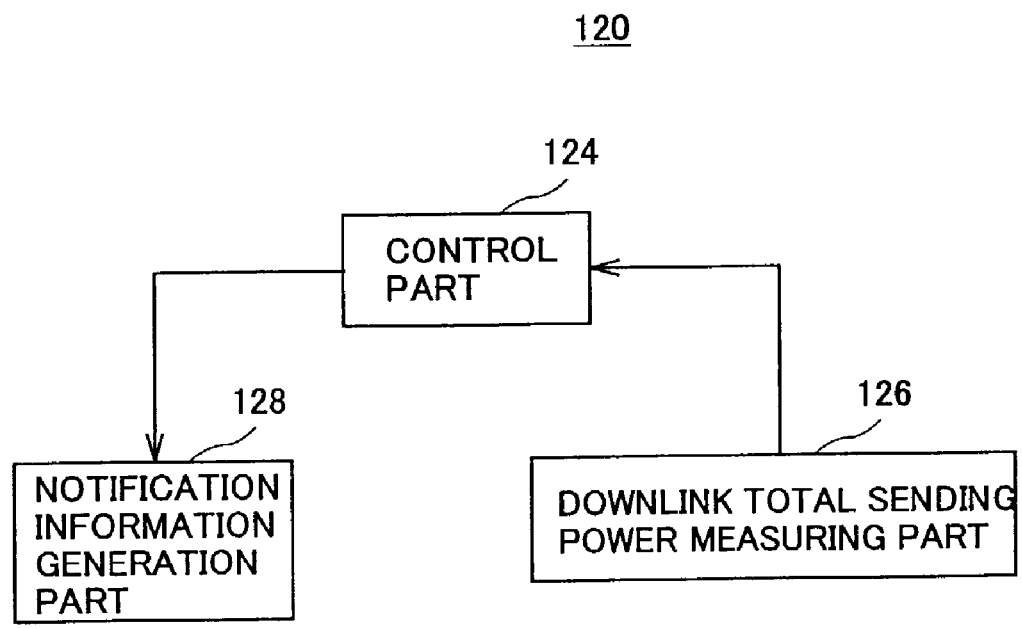
FIG. 4 shows a block diagram of an example of a base station 120 according to the present invention.

FIG. 4 shows a block diagram of an example of a base station 120 that sets the threshold of Ec/No per a chip of the common pilot signal, wherein the threshold of Ec/No is changeable. As shown in the figure, the base station 120 includes a control part 124, a downlink total sending power measuring part 126 and a notification information generation part 128.

The control part 124 controls the whole of the base station 120. The downlink total sending power measurement part 126 measures the power of the signal sent by the base station 120 itself, and obtains power levels of signals sent by other base stations from the other base stations via the RNC 130. Next, the downlink total sending power measurement part 126 adds the power of the signal sent from the base station itself to the power of signals sent from other base stations, so that the downlink total sending power is calculated. The downlink total sending power changes according to traffic amount in the mobile communication system 100. The calculated downlink total sending power is sent to the notification information generation part 128 via the control part 124.

The notification information generation part 128 sets the threshold of Ec/No per a chip of the common pilot signal on the basis of the downlink total sending power from the downlink total sending power measuring part 126. More particularly, when the downlink total sending power is a large value, the notification information generation part 128 sets a small threshold in consideration that the Ec/No per a chip of the common pilot signal becomes small as downlink interference power in the mobile station 110 becomes large. On the other hand, when the downlink total sending power is smaller than the large value, the notification information generation part 128 sets a large threshold (which is a value that is larger than the above-mentioned small threshold) in consideration that the Ec/No per a chip of the common pilot signal becomes large as downlink interference power in the mobile station 110 becomes small. That is, the notification information generation part 128 sets the threshold such that the threshold is inversely proportional to the downlink total sending power. The notification information generation part 128 sends the threshold to the cell 122 that is formed by the base station itself.

When the RNC 130 sets the threshold of Ec/No per a chip of the common pilot signal on the basis of the calculated downlink total sending power, the RNC 130 has the same configuration as that shown in FIG. 4. In this case, the downlink total sending power measurement part in the RNC 130 obtains downlink the sending power level for each base station, and sums them to calculate the downlink total sending power. The notification information generation part in the RNC 130 sets the threshold in the same way as performed in the notification information generation part 128 in the base station on the basis of the downlink total sending power. Then, the RNC 130 sends the threshold to each base station. Then, each base station sends the threshold to each cell.

As mentioned above, the mobile station 110 resides in the cell 122-2 formed by the base station 120-2. Therefore, the mobile station 110 receives the threshold from the base station 120-2. The mobile station 110 compares the threshold sent from the base station 120-2 with a measured value of Ec/No per a chip of the common pilot signal sent from the base station. When the measurement value does not exceed the threshold, the mobile station 110 determines that the residing cell is not optimal, so that the mobile station 110 searches signals sent from surrounding base stations, and measures receiving levels of the signals. On the other hand, when the measurement value exceeds the threshold, the mobile station 110 determines that the cell is optimal so that the mobile station 110 does not perform the surrounding cell measurement.

Figure 5:
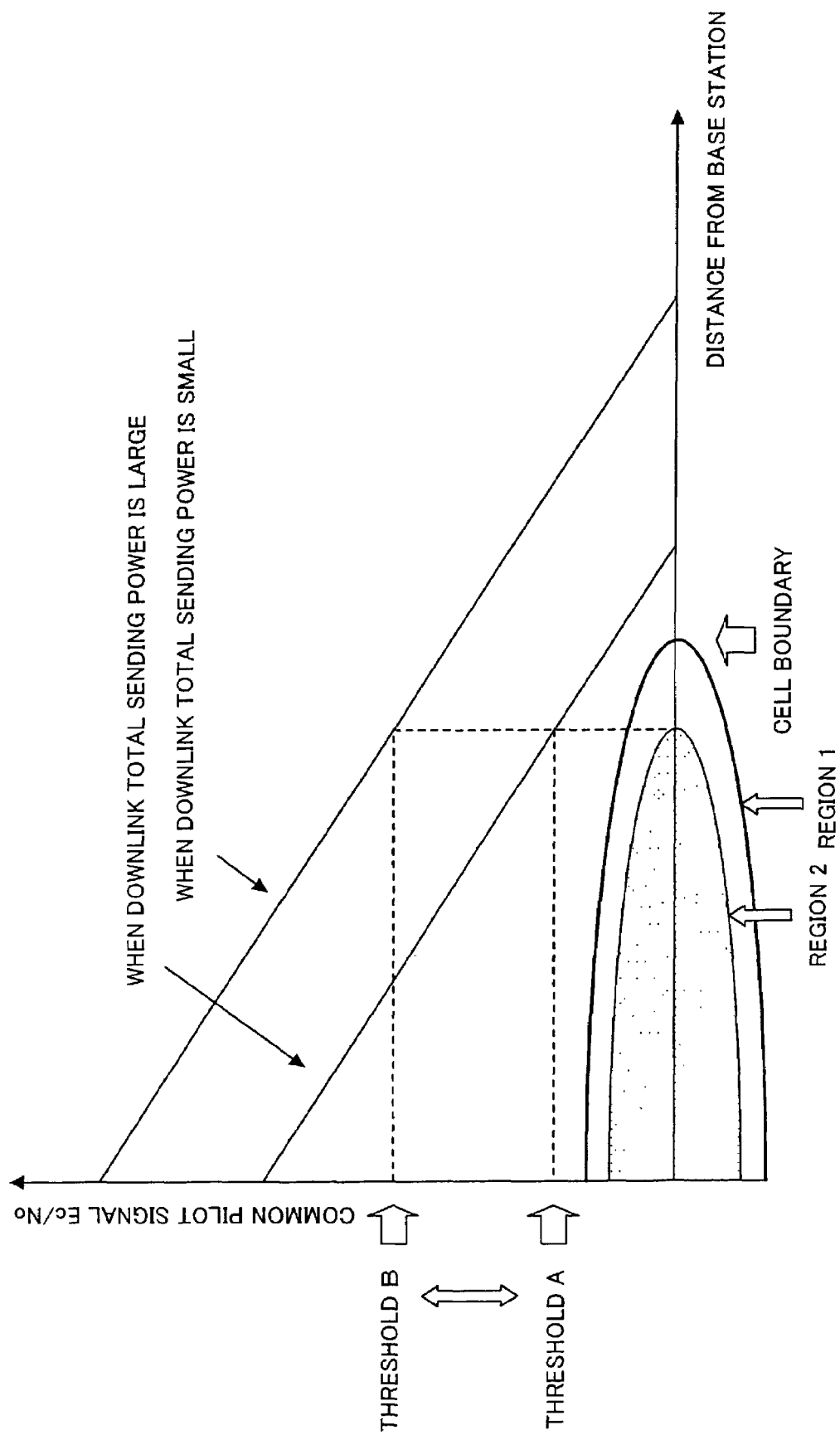
FIG. 5 is a figure for explaining the relationship between the downlink total sending power and the threshold of Ec/No.

FIG. 5 shows a relationship between the downlink total sending power and the threshold of Ec/No per a chip of the common pilot signal. In the figure, region 1 is a region of a cell of the base station 120. Region 2 shows a region in which the surrounding cell measurement by the mobile station 110 is unnecessary. Threshold A is a threshold determined when the downlink total sending power is a set value. A threshold B is a threshold determined when the downlink total sending power is smaller than the set value.

The base station 120 or the RNC 130 sets the threshold as the threshold A when the downlink total sending power is a certain value (which may be larger than a predetermined value). At this time, Ec/No in the mobile station 110 becomes equal to or less than the threshold A when the mobile station 110 goes out of the region 2. Therefore, by omitting the surrounding cell measurement when Ec/No exceeds the threshold A, the surrounding cell measurement can be properly performed only when necessary.

The base station 120 or the RNC 130 sets a threshold to be the threshold B when the downlink total sending power is smaller than the value of the above-mentioned case. Also, at this time, since the threshold B is properly set as larger than the threshold A, Ec/No in the mobile station 110 becomes equal to or less than the threshold B when the mobile station 110 goes out of the region 2. Therefore, by omitting the surrounding cell measurement when Ec/No exceeds the threshold B, the surrounding cell measurement can be properly performed only when necessary.

As mentioned above, the base station 120 or the RNC 130 sets a proper threshold of Ec/No according to the downlink total sending power that changes every moment, such that the mobile station 110 omits the surrounding cell measurement when the measured Ec/No exceeds the threshold. Accordingly, the surrounding cell measurement is performed actually only when necessary. Therefore, power consumption in the mobile station 110 can be decreased, and battery life is improved.

Although the threshold of the Ec/No is properly set by the base station 120 or the RNC 130 on the basis of the downlink total sending power that changes every moment in the above-mentioned embodiment, the threshold can be set on the basis of the downlink traffic amount that changes every moment.

In this case, the base station 120 measures the downlink traffic amount in the base station itself, obtains downlink traffic amount of other base stations via the RNC 130, and sums them to obtain a total amount of downlink traffic. Or, the RNC 130 obtains the downlink traffic amount of every base station, then, calculates the total downlink traffic amount.

The downlink traffic amount is in proportion to the downlink total sending power. That is, the downlink traffic amount is inversely proportional to Ec/No per a chip of the common pilot signal. Therefore, the base station 120 or the RNC 130 sets the threshold of Ec/No to be a small threshold when the calculated total downlink traffic amount is a large amount, and the base station 120 or the RNC 130 sets the threshold of Ec/No to be a large threshold (which is larger than the small threshold) when calculated total downlink traffic amount is a small amount (which is smaller than the large amount).

In addition, the base station 120 or the RNC 130 can set the threshold of Ec/No on the basis of time frames in a day. There is a correlation between the downlink traffic amount and the time frame, for example, the downlink traffic amount in the daytime is larger than that in the nighttime. As mentioned above, the downlink traffic amount is inversely proportional to Ec/No per a chip of the common pilot signal. Therefore, the base station 120 or the RNC 130 sets the threshold of Ec/No to be small in the daytime when downlink traffic amount is large, and sets it to be large in the nighttime when downlink traffic amount is small.

The base station 120 or the RNC 130 may set a proper threshold on the basis of a condition for which the base station is installed. Ec/No per a chip of the common pilot signal may differ according to the size of the cell, and to the environment of placement of the base station such as in an urban area or in a suburban area. Therefore, the base station 120 or the RNC 130 sets the threshold of Ec/No to be a small threshold in consideration that downlink total sending power in the urban area is a large value, and sets the threshold to be a large threshold (which is larger than the small threshold) in consideration that the downlink total sending power becomes a small value (which is smaller than the large value) in the suburban area.

In addition, the base station 120 or the RNC 130 can set the threshold of Ec/No to be a small threshold when the size of the cell formed by the base station 120 is a large value. In other words, when the region where surrounding cell measurement by the mobile station 110 is unnecessary is large so that Ec/No in the boundary of the region is small, the base station 120 or the RNC 130 sets the threshold of Ec/No to be a small threshold. The base station 120 or the RNC 130 can set the threshold of Ec/No to be a large threshold (which is larger than the small threshold) when the size of the cell formed by the base station 120 is a small value (which is smaller than the large value), in other words, when the region where surrounding cell measurement by the mobile station 110 is unnecessary is small so that Ec/No in the boundary of the region is large, the threshold is set to be large.

The base station 120 or the RNC 130 may set a proper threshold of Ec/No on the basis of measurement value of Ec/No per a chip of the common pilot signal in the mobile station 110. In this case, the mobile station 110 sends measured Ec/No to the base station 120 or the RNC 130. The base station 120 or the RNC 130 sets the threshold of Ec/No to be a small threshold when the Ec/No measured by the mobile station 110 is a small value, and the base station 120 or the RNC 130 sets the threshold of Ec/No to be a large threshold (which is larger than the small threshold) when the Ec/No measured by the mobile station 110 is a large value (which is larger than the small value).

The mobile station 110 omits surrounding cell measurement when Ec/No measured again exceeds the threshold. Accordingly, since the surrounding cell measurement is properly performed only when it is necessary, power consumption in the mobile station 110 is decreased so that battery life improves.

As mentioned above, according to the present invention, since the threshold of Ec/No of the common pilot signal can be changed on the basis of a criterion, surrounding cell measurement in the mobile station can be performed only when necessary. Thus, according to the present invention, power consumption of the mobile station can be decreased and battery life can be improved.

The present invention is not limited to the specifically disclosed embodiments, and variations and modifications may be made without departing from the scope of the invention.

What is claimed is:

1. A mobile communication system comprising a mobile station and a plurality of base stations, wherein, when a signal energy to noise power density ratio of a common pilot signal exceeds a threshold, said mobile station does not perform receiving level measurement for signals sent from said base stations, said common pilot signal being sent to said mobile station from the base station that forms a cell where said mobile station resides, said base station comprising:

a part for measuring a first sending power of a signal said base station, obtaining second sending powers of signals sent by other base stations, and obtaining a total sending power of said first power and said second powers;

a part for setting said threshold according to said total sending power such that said threshold set for a first total sending power is greater than a threshold set for a second total sending power that is greater than said first total sending power; and a part for sending said threshold to said mobile station; said mobile station comprising:

a part for measuring said signal energy to noise power density ratio; and a part for receiving said threshold sent from said base station.

2. A mobile communication system comprising a mobile station and a plurality of base stations, wherein, when a signal energy to noise power density ratio of a common pilot signal exceeds a threshold, said mobile station does not receive a level measurement for signals sent from said base stations, said common pilot signal being sent to said mobile station from the base station that forms a cell where said mobile station resides, said base station comprising:
a part for measuring a first amount of downlink traffic of said station, obtaining second amounts of downlink traffic of other base stations, and obtaining a total amount of downlink traffic from said first amount and said second amounts;
a part for setting said threshold according to said total amount of downlink traffic such that said threshold set for a first total amount of downlink traffic is greater than a threshold set for a second total amount of downlink traffic that is greater than said first total amount of downlink traffic;
a part for sending said threshold to said mobile station;
said mobile station comprising:
a part for measuring said signal energy to noise power density ratio; and
a part for receiving said threshold sent from said base station.

3. The mobile communication system as claimed in claim 1, wherein said part for setting sets said threshold according to time.

4. The mobile communication system as claimed in claim 1, wherein said part for setting sets said threshold according to a condition for installing said base station.

5. A mobile communication system comprising a mobile station, a plurality of base stations and a radio network control apparatus, wherein, when a signal energy to noise power density ratio of a common pilot signal exceeds a threshold, said mobile station does not perform receiving level measurement for signals sent from said base stations, said common pilot signal being sent to said mobile station from the base station that forms a cell where said mobile station resides, said radio network control apparatus comprising:
a part for measuring a first sending power of a signal sent by said base station, obtaining second sending powers of signals sent by other base stations, and obtaining a total sending power of said first power and said second power;
a part for setting said threshold according to said total sending power such that said threshold set for a first total sending power is greater than a threshold set for a second total sending power that is greater than said first total sending power; and
a part for a sending said threshold to said mobile station;
said mobile station comprising:
a part for measuring said signal energy to noise power density ratio; and
a part for receiving said threshold sent from said radio network control apparatus.

6. A base station used in a mobile communication system comprising a mobile station and a plurality of base stations, wherein, when a signal energy to noise power density ratio of a common pilot signal exceeds a threshold, said mobile station does not perform receiving level measurement for signals sent from said base stations, said common pilot signal being sent to said mobile station from said base station that forms a cell where said mobile station resides, said base station comprising:
a part for measuring a first sending power of a signal sent by said base station, obtaining second sending powers of signals sent by other base stations, and obtaining a total sending power of said first power and said second powers;
a part for setting said threshold according to said total sending power such that said threshold set for a first total sending power is greater than a threshold set for a second total sending power that is greater than said first total sending power; and
a part for sending said threshold to said mobile station.

7. A base station used in a mobile communication system comprising a mobile station and a plurality of base stations, wherein, when a signal energy to noise power density ratio of a common pilot signal exceeds a threshold, said mobile station does not receive a level measurement for signals sent from said from said base stations, said common pilot signal being sent to said mobile station from said base station that from a cell where said mobile station resides, said base station comprising:
a part for measuring a first amount of downlink traffic of said base station, obtaining second amounts of downlink traffic of other base stations, and obtaining a total amount of downlink traffic from said first amount and said second amounts;
a part for setting said threshold according to said total amount of downlink traffic such that said threshold set for a first total amount of downlink traffic is greater than a threshold set for a second total amount of downlink traffic that is greater than said first total amount of downlink traffic; and
a part for sending said threshold to said mobile station.

8. The base station as claimed in claim 6, wherein said part for setting sets said threshold according to time.

9. The base station as claimed in claim 6, wherein said part for setting sets said threshold according to a condition for installing said base station.

10. A radio network control apparatus in a mobile communication system comprising a mobile station, plurality of base stations and said radio network control apparatus, wherein, when a signal energy to noise power density ratio of a common pilot signal exceeds a threshold, said mobile station does not perform receiving level measurement for signals sent from said base stations, said common pilot signal being sent to said mobile station from the base station that that forms a cell where said mobile station resides, said radio network control apparatus comprising:
a part for measuring a first sending power of a signal sent by said base station, obtaining second sending powers of signals sent by other base stations, and obtaining a total sending power of said first power and said second powers;
a part for setting said threshold according to said total sending power such that said threshold set for a first total sending power is greater than a threshold set for a second total sending power that is greater than said first total sending power; and
a part for sending said threshold to said mobile station.

11. A radio network control apparatus in a mobile communication system comprising a mobile station, a plurality of base stations and said radio network control apparatus, wherein, when a signal energy to noise power density ratio of a common pilot signal exceeds a threshold , said mobile station does not perform receiving level measurement for signals sent from said base stations, said common pilot signal being sent to said mobile station from the base station that forms a cell where said mobile station resides, said radio network control comprising:
a part for measuring a first amount of downlink traffic of said base station, obtaining second amounts of downlink traffic of other base stations, and obtaining a total amount of downlink traffic from said first amount and said second amounts;

a part for setting said threshold according to said total amount of downlink traffic such that said threshold set for a first total amount of downlink traffic is greater than a threshold set for a second total amount of downlink traffic that is greater than said first total amount of downlink traffic; and a part for sending said threshold to said mobile station.

12. The radio network control apparatus as claimed in claim 10, wherein said part for setting sets said threshold according to time.

13. The radio network control apparatus as claimed in claim 10, wherein said part for setting sets said threshold according to a condition for installing said base station.

14. A mobile station usable in a mobile communication system comprising said mobile station and a plurality of base stations, wherein, when a signal energy to noise power density ratio of a common pilot signal exceeds a threshold in said mobile station, said mobile station does not perform receiving level measurement for signals sent from said base stations, said common pilot signal being sent to said mobile station from the base station that forms a cell where said mobile station resides, said mobile station comprising:

a part configured to receive said threshold sent from said base station, said threshold being set by said base station or a radio network control apparatus according to a total sending power such that said threshold set for a first total sending power is greater than a threshold set for a second total sending power that is greater than said first total sending power, wherein said base station or said radio network control apparatus includes a part for measuring a first sending power of a signal sent by said base station, obtaining second sending powers of signals sent by others base stations, and obtaining the total sending power of said first power and said second powers.

15. A mobile station usable in a mobile communication system comprising said mobile station and a plurality of base stations, wherein, when a signal energy to noise power density ratio of a common pilot signal exceeds a threshold in said mobile station, said mobile station does not perform receiving level measurment for signals sent from said base stations, said common pilot signal being sent to said mobile station from the base station that forms a cell where said mobile station resides, said mobile station comprising:

a part configured to receive said threshold sent from said base station, said threshold being set by said base station or a radio network control apparatus according to a total amount of downlink traffic such that said threshold set for a first total amount of downlink traffic is greater than a threshold set for a second total amount of downlink traffic that is greater than said first total amount of downlink traffic, wherein said base station or said radio network control apparatus includes a part for measuring a first amount of downlink traffic of said base station, obtaining second amounts of downlink traffic of other base stations, and obtaining a total amount of downlink traffic from said first amount and said second amounts.

16. The mobile station as claimed in claim 14, wherein said base station or said radio network control apparatus sets said threshold according to time.

17. The mobile station as claimed in claim 14, wherein said base station or said radio network control apparatus sets said threshold according to a condition for installing said base station.

18. A method used for decreasing power consumption in a mobile station usable in a mobile communication system comprising said mobile station and a plurality of base stations, wherein, when a signal energy to noise power density ratio of a common pilot signal exceeds a threshold in said mobile station, said mobile station does not perform receiving level measurement for signals sent from said base stations, said common pilot signal being sent to said mobile station from the base station that forms a cell where said mobile station resides, said method comprising the step of:

said base station or a radio network control apparatus measuring a first sending power of a signal sent by said base station, obtaining second sending powers of signals sent by other base stations, and obtaining a total sending power of said first power and said second powers;

said base station or a radio network control apparatus setting said threshold according said total sending power such that said threshold set for a first total sending power is greater than a threshold set for a second total sending power that is greater than said first total sending power;

said base station or a radio network control apparatus sending said threshold to said mobile station; and said mobile station receiving said threshold sent from said base station or a radio network control apparatus.

19. A method used for decreasing power consumption in a mobile station usable in a mobile communication system comprising said mobile station and a plurality of base stations, wherein, when a signal energy to noise power density ratio of a common pilot signal exceeds a threshold in said mobile station, said mobile station does not perform receiving level measurement for signals sent from said base stations, said common pilot signal being sent to said mobile station from the base station that forms a cell where said mobile station resides, said method comprising the step of:

said base station or a radio control apparatus measuring a first amount of downlink traffic of said base station, obtaining second amounts of downlink traffic of other base stations, and obtaining a total amount of downlink traffic from said first amount and said second amounts;

said base station or a radio network control apparatus setting said threshold according to said total amount of downlink traffic such that said threshold set for a first total amount of downlink traffic is greater than a threshold set for a second total amount of downlink traffic that is greater than said first total amount of downlink traffic;

said base station or a radio network control apparatus sending said threshold to said mobile station; and said mobile station receiving said threshold sent from said base station or a radio network control apparatus.

20. The method as claimed in claim 18, wherein said base station or said radio network control apparatus sets said threshold according to time.

21. The method as claimed in claim 18, wherein said base station or said radio network control apparatus sets said threshold according to a condition for installing said base station.

22. A mobile communication system comprising a mobile station, a plurality of base stations and a radio network control apparatus, wherein, when a signal energy to noise power density ratio of a common pilot signal exceeds a threshold, said mobile station does not perform receiving level measurement for signals sent from said base stations, said common pilot signal being sent to said mobile station from base station that forms a cell where said mobile station resides, said radio network control apparatus comprising:

a part for measuring a first amount of downlink traffic of said base station, obtaining second amounts of downlink traffic of other base stations, and obtaining a total amount of downlink traffic from said first amount and said second amounts;

a part for setting said threshold according to said total amount of downlink traffic such that said threshold set for a first total amount of downlink traffic is greater than a threshold set for a second total amount of downlink traffic that is greater than said first total amount of downlink traffic; and a part for sending said threshold to said mobile station;

said mobile station comprising:

a part for measuring said signal energy to noise power density ratio; and a part for receiving said threshold sent from said radio network control apparatus.

* * * * *